July 18, 1939.  J. ULMER  2,166,273
COMBINATION SINK STOPPER AND STRAINER
Filed Feb. 2, 1939
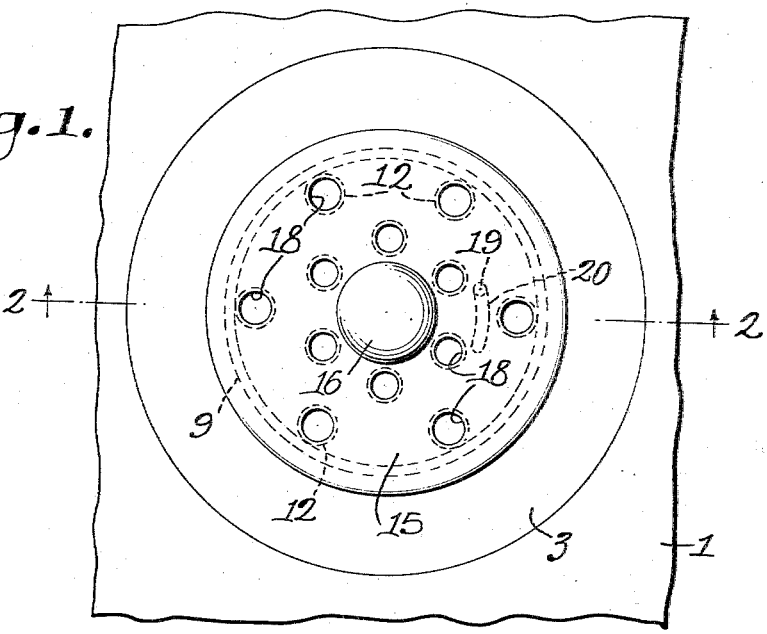
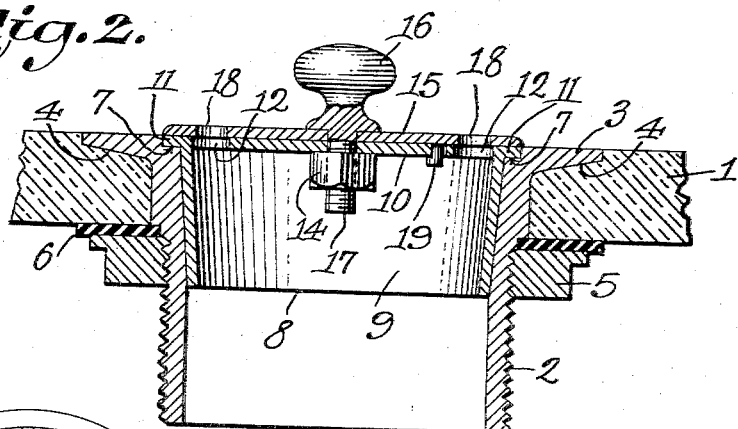
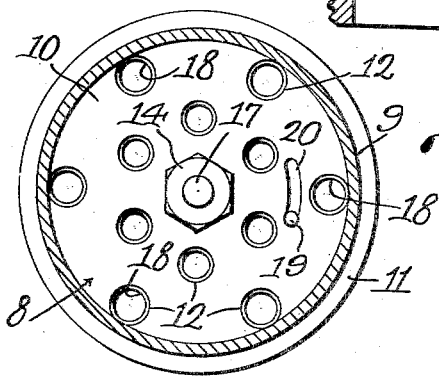
Joseph Ulmer
INVENTOR.
ATTORNEYS.

Patented July 18, 1939

2,166,273

UNITED STATES PATENT OFFICE 2,166,273

COMBINATION SINK STOPPER AND STRAINER

Joseph Ulmer, Chicago, Ill.

Application February 2, 1939, Serial No. 254,303

1 Claim. (Cl. 4—287)

The device forming the subject matter of this application is a combined sink stopper and strainer. The invention aims to provide novel means for mounting the gate portion of the strainer for movement with respect to the body of the combined article, and to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawing:

Fig. 1 shows in top plan, a portion of a sink wherein the device forming the subject matter of this application is incorporated;

Fig. 2 is a cross section on the line 2—2 of Fig. 1;

Fig. 3 is a bottom plan of the combined sink stopper and strainer, the body of the article being in section.

The numeral 1 marks the bottom of a sink wherein is mounted a tubular outlet member 2, provided at its upper end with an outstanding flange 3 seated in a rebate 4 in the sink bottom 1. The outlet member 2 is held in place by a nut 5 threaded on it, an annular compressible gasket 6 being interposed between the nut and the sink bottom 1. In its upper surface, the outlet member 2 has an annular recess 7.

A combined stopper and strainer 8 is provided and, preferably, is made of metal, the stopper and strainer including a tapered tubular body 9, adapted to fit watertight but removably in the upper part of the outlet member 2. At its upper end, the body 9 is supplied with an integral closure plate 10. At its upper end, the body 9 has an outstanding flange 11 received in the recess 7 of the outlet member 2. The closure plate 10 has openings 12 arranged concentrically with respect to the center of the plate. A nut 14 is welded to the lower surface of the closure plate 10 and may be considered as part of the closure plate.

Above the closure plate 10 of the body 9 is disposed a disk-like gate 15, no greater in diameter than the flange 11 of the body 9. A turning head 16, of any desired form, is welded to the gate 15, centrally thereof. The head 16 has a depending stem 17, extended through the gate 15 and mounted to turn freely in the closure plate 10 of the body 9, the stem 17 being threaded into the nut 14. The gate 15 has openings 18 registering axially with the openings 12 of the closure plate 10. The openings 12 preferably are a little larger than the openings 18, to provide a ready flow for water which may run downwardly through them. The rotation of the gate 15 by means of the head 16 is limited, since the gate 15 has a depending, fixed, stop pin 19, received in an arcuate slot 20 in the closure plate 10 of the stopper and strainer 8.

When the openings 18 and 12 are in registration, the device functions as a strainer. By rotating the gate 15 a little, through the instrumentality of the knob 16, the openings 18 are moved out of registration with the openings 12. During this rotation, the gate 15 is clamped down tightly on the plate 10, to prevent leakage, because the stem 17 is threaded into the nut 14. When the stop pin 19 is at one end of the slot 20, the openings 18 and 12 are in registration, and the operator does not have to follow a trial and error process, to get the openings in registration. By means of the head 16, the entire device can be lifted out of the outlet member 2.

When the device is used as a stopper, rather than a strainer, the openings 12 and 18 are out of registration, and the gate 15 is clamped down tightly on the closure plate 10 of the stopper and strainer, since the stem 17 is threaded into the nut 14. The device, then, can be used like an ordinary hermetic sink plug, and no attention need be given to the fact that, by rotating the gate 15, the article can be converted into a strainer.

What is claimed is:

A combined sink stopper and strainer comprising a tubular body having a closure at its upper end, a gate above the closure, the gate and the closure having openings so located as to be brought into registration when the gate is rotated, the gate having a stem threaded into the closure and clamping the gate hermetically on the closure when the openings of the gate and the closure are out of registration.

JOSEPH ULMER.